(12) United States Patent
Shreve et al.

(10) Patent No.: US 11,978,243 B2
(45) Date of Patent: *May 7, 2024

(54) SYSTEM AND METHOD USING AUGMENTED REALITY FOR EFFICIENT COLLECTION OF TRAINING DATA FOR MACHINE LEARNING

(71) Applicant: Xerox Corporation, Norwalk, CT (US)

(72) Inventors: Matthew A. Shreve, Mountain View, CA (US); Sricharan Kallur Palli Kumar, Mountain View, CA (US); Jin Sun, Redwood City, CA (US); Gaurang R. Gavai, San Francisco, CA (US); Robert R. Price, Palo Alto, CA (US); Hoda M. A. Eldardiry, Blacksburg, VA (US)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/527,859

(22) Filed: Nov. 16, 2021

(65) Prior Publication Data
US 2022/0076072 A1   Mar. 10, 2022

Related U.S. Application Data

(63) Continuation of application No. 16/856,646, filed on Apr. 23, 2020, now Pat. No. 11,200,457, which is a
(Continued)

(51) Int. Cl.
*G06V 10/772* (2022.01)
*G06F 18/21* (2023.01)
(Continued)

(52) U.S. Cl.
CPC ........ *G06V 10/772* (2022.01); *G06F 18/2148* (2023.01); *G06F 18/217* (2023.01);
(Continued)

(58) Field of Classification Search
None
See application file for complete search history.

(56) References Cited

U.S. PATENT DOCUMENTS 10,147,023 B1    12/2018   Klaudiny
10,229,539 B2    3/2019    Shikoda
(Continued)

OTHER PUBLICATIONS

Kaiming He, Georgia Gkioxari, Piotr Dollar Ross Girshick, "Mask R-CNN", arXiv:1703.06870v1 [cs.CV] Mar. 20, 2017.*
(Continued)

*Primary Examiner* — Jiangeng Sun

(57) ABSTRACT

One embodiment provides a system that facilitates efficient collection of training data. During operation, the system obtains, by a recording device, a first image of a physical object in a scene which is associated with a three-dimensional (3D) world coordinate frame. The system marks, on the first image, a plurality of vertices associated with the physical object, wherein a vertex has 3D coordinates based on the 3D world coordinate frame. The system obtains a plurality of second images of the physical object in the scene while changing one or more characteristics of the scene. The system projects the marked vertices on to a respective second image to indicate a two-dimensional (2D) bounding area associated with the physical object.

20 Claims, 6 Drawing Sheets
(3 of 6 Drawing Sheet(s) Filed in Color)

Related U.S. Application Data continuation of application No. 15/826,588, filed on Nov. 29, 2017, now Pat. No. 10,699,165.

(60) Provisional application No. 62/579,000, filed on Oct. 30, 2017.

(51) Int. Cl.
| | |
|---|---|
| *G06F 18/214* | (2023.01) |
| *G06F 18/28* | (2023.01) |
| *G06T 7/55* | (2017.01) |
| *G06T 19/00* | (2011.01) |
| *G06V 10/94* | (2022.01) |
| *G06V 20/64* | (2022.01) |

(52) U.S. Cl.
CPC ............... *G06F 18/28* (2023.01); *G06T 7/55* (2017.01); *G06T 19/006* (2013.01); *G06V 10/94* (2022.01); *G06V 20/64* (2022.01); *G06T 2210/12* (2013.01); *G06T 2219/004* (2013.01)

(56) References Cited

U.S. PATENT DOCUMENTS

| | | |
|---|---|---|
| 10,304,159 B2 | 5/2019 | Aoyagi |
| 10,366,521 B1 | 7/2019 | Peacock |
| 2008/0189083 A1 | 8/2008 | Schell |
| 2010/0040272 A1 | 2/2010 | Zheng |
| 2012/0200601 A1 | 8/2012 | Osterhout |
| 2013/0127980 A1 | 5/2013 | Haddick |
| 2015/0037775 A1 | 2/2015 | Ottensmeyer |
| 2016/0260261 A1 | 9/2016 | Hsu |
| 2016/0292925 A1 | 10/2016 | Montgomerie |
| 2016/0328887 A1 | 11/2016 | Elvezio |
| 2016/0335578 A1 | 11/2016 | Sagawa |
| 2016/0349511 A1 | 12/2016 | Meiron |
| 2017/0366805 A1 | 12/2017 | Sevostianov |
| 2018/0035606 A1 | 2/2018 | Burdoucci |
| 2018/0204160 A1 | 7/2018 | Chehade |
| 2018/0315329 A1 | 11/2018 | D'Amato |
| 2018/0336732 A1 | 11/2018 | Schuster |
| 2019/0156202 A1 | 5/2019 | Falk |
| 2019/0362556 A1 | 11/2019 | Ben-Dor |
| 2020/0081249 A1 | 3/2020 | Brusnitsyn |
| 2020/0210780 A1 | 7/2020 | Torres |
| 2021/0350588 A1 | 11/2021 | Tanida |

OTHER PUBLICATIONS

Umar Lqbal, Anton Milan, and Juergen Gall, "PoseTrack: Joint Multi-Person Pose Estimation and Tracking ", arXiv:1611.07727v3 [cs.CV] Apr. 7, 2017.*

Kevin Lai et al., "A Large-Scale Hierarchical Multi-View RGB-D Object Dataset", Robotics and Automation (ICRA), 2011 IEEE International Conferene on, IEEE, May 9, 2011, pp. 1817-1824. *abstract* *Section IV* *Figure 6*.

Georgios Georgakis et al., "Multiview RGB-D Dataset for Object Instance Detection", 2016 Fourth International Conference on 3D Vision (3DV), Sep. 26, 2016, pp. 426-434. *Abstract* *Section 3*.

Aldoma Aitor et al., "Automation of "Ground Truth" Annotation for Multi-View RGB-D Object Instance Recognition Datasets", 2014 IEEE/RSJ International Conference on Intelligent Robots and Systems, IEEE, Sep. 14, 2014, pp. 5016-5023. *abstract* *Section III*.

Pat Marion et al., "LabelFusion: A Pipeline for Generating Ground Truth Labels for Real RGBD Data of Cluttered Scenes", Jul. 15, 2017, retrieved form the Internet: URL: https://arxiv.org/pdf/1707.04796.pdf. *abstract* *Section 111*.

Alhaija et al., "Augmented Reality Meets Computer Vision: Efficient Data Generation for Urban Driving Scenes", Aug. 4, 2017.

Ohan Oda, et al.; "Virtual replicas for remote assistance in virtual and augmented reality", Proceedings of the 28th Annual ACM Symposium on User Interface Software & Technology, Nov. 8-11, 2015, Charlotte, NC, pp. 405-415 (Year: 2015).

Mueller, How To Get Phone Notifications When Your Brother HL-3170CDW Printer Runs Out Of Paper, https://web.archive.org/web/20180201064332/http://www.shareyourrepair.com/2014/12/how-to-get-push-notifications-from-brother-printers-with-gmail-boxcar.html (Year: 2018).

Epson Printer Says Out of Paper but It Isn't, https://smartprintsupplies.com/blogs/news/ p-strong-epson-printer-says-out-of-paper-but-it-isnt-strong-p-p-p (Year: 2018).

Adepu et al. Control Behavior Integrity for Distributed Cyber-Physical Systems (Year: 2018).

Khurram Soomro "UCF101: A Dataset of 101 Human Actions Classes From Videos in The Wild" Dec. 2012.

J. L. Pech-Pacheco et al."Diatom autofocusing in brightheld microscopy: a comparative study" IEEE 2000.

Said Pertuz et al "Analysis of focus measure operators in shape-from-focus", Research gate Nov. 2012, Accepted Nov. 7, 2012, Available priline Nov. 16, 2012.

* cited by examiner

SYSTEM AND METHOD USING AUGMENTED REALITY FOR EFFICIENT COLLECTION OF TRAINING DATA FOR MACHINE LEARNING

RELATED APPLICATIONS

This application is a continuation of U.S. application Ser. No. 16/856,646, entitled "SYSTEM AND METHOD USING AUGMENTED REALITY FOR EFFICIENT COLLECTION OF TRAINING DATA FOR MACHINE LEARNING," by inventors Matthew A. Shreve, Sricharan Kallur Palli Kumar, Jin Sun, Gaurang R. Gavai, Robert R. Price, and Hoda M. A. Eldardiry, filed 23 Apr. 2020, which is a continuation of U.S. application Ser. No. 15/826,588, entitled "SYSTEM AND METHOD USING AUGMENTED REALITY FOR EFFICIENT COLLECTION OF TRAINING DATA FOR MACHINE LEARNING," by inventors Matthew A. Shreve, Sricharan Kallur Palli Kumar, Jin Sun, Gaurang R. Gavai, Robert R. Price, and Hoda M. A. Eldardiry, filed 29 Nov. 2017, the disclosures of which are incorporated by reference herein.

U.S. Provisional Application No. 62/579,000, entitled "SYSTEM AND METHOD USING AUGMENTED REALITY FOR EFFICIENT COLLECTION OF TRAINING DATA FOR MACHINE LEARNING," by inventors Matthew A. Shreve, Sricharan Kallur Palli Kumar, Jin Sun, Gaurang R. Gavai, Robert R. Price, and Hoda M. A. Eldardiry, filed 30 Oct. 2017, the disclosure of which is incorporated by reference herein.

BACKGROUND

Field

This disclosure is generally related to computer vision systems. More specifically, this disclosure is related to a system and method using augmented reality (AR) for efficient collection of training data for machine learning.

Related Art

Currently, training a computer vision system is accomplished through a tedious process of manually collecting many images or videos. A human expert is subsequently needed to annotate or label the object of interest in each of the images or video frames. This inefficient process may result in high costs due to the significant amount of time required as well as an increased error rate in labeling based on human fatigue.

Various efforts have been made to reduce the burden of manual labeling, including the development of human computer interfaces that allow efficient parsing of images and drawing of bounding boxes, and the use of technology that provides pointers that users can then modify instead of specifying them from scratch. For example, a Kalman filter may be used to predict or interpolate the location of an object in a video based on its past trajectory, with a human adjusting these predictions as needed. However, these methods still require significant manual labor and do not provide a significant reduction in the labeling process necessary for collecting training data.

SUMMARY

One embodiment provides a system that facilitates efficient collection of training data. During operation, the system obtains, by a recording device, a first image of a physical object in a scene which is associated with a three-dimensional (3D) world coordinate frame. The system marks, on the first image, a plurality of vertices associated with the physical object, wherein a vertex has 3D coordinates based on the 3D world coordinate frame. The system obtains a plurality of second images of the physical object in the scene while changing one or more characteristics of the scene. The system projects the marked vertices on to a respective second image to indicate a two-dimensional (2D) bounding area associated with the physical object.

In some embodiments, the marked plurality of vertices corresponds to one or more regions of interest on the physical object. Projecting the marked vertices further comprises indicating a 2D bounding area associated with the one or more regions of interest on the physical object.

In some embodiments, the marked plurality of vertices can indicate one or more of: a polygon; a portion of a surface plane; and a volume.

In some embodiments, marking the plurality of vertices further comprises: determining how to indicate the 2D bounding area of the projected marked vertices on the respective second image.

In some embodiments, the 2D bounding area and the respective second image are presented on a display associated with the recording device, and the 2D bounding area indicates a 2D shape or a 3D volume.

In some embodiments, the 2D bounding area is indicated by one or more of: a type, pattern, or color of a connector between the projected vertices in the respective second image; a color, shading, or fill of a shape formed by connecting the projected vertices in the respective second image; text describing the 2D bounding area; and an indication of a label or description for the 2D bounding area.

In some embodiments, a 2D bounding area corresponds to a characteristic of the scene.

In some embodiments, a characteristic of the scene is one or more of: a pose of the recording device; a lighting of the scene; a distance of the recording device from the physical object; an orientation of the recording device in relation to the physical object; a background of the physical object or the scene; and an occlusion of one or more portions of the physical object.

In some embodiments, the system stores, in a collection of training data, the first image with the marked plurality of vertices. The system stores, in the collection of training data, the plurality of second images with the projected marked vertices. The system trains, based on the collection of training data, a convolutional neural network to identify features of the physical object. The system deploys the trained network on a mobile computing device to identify the features of the physical object.

In some embodiments, the recording device includes one or more of: an augmented reality device; a virtual reality device; a device with magnetic sensors which determine 3D coordinates for a vertex in the 3D world coordinate frame; a camera and a hand-tracking sensor; a camera which records red, green, and blue (RGB), wherein the hand-tracking sensor determines 3D coordinates for a vertex in the 3D world coordinate frame; a camera which records red, green, and blue (RGB), and a 3D sensor which records a depth; a device which records images or video, and determines 3D coordinates for a vertex in the 3D world coordinate frame based on visual cues or a position-sensing technology; and a device which records images or video and includes a (3D) sensor.

BRIEF DESCRIPTION OF THE FIGURES

The patent or application file contains at least one drawing executed in color. Copies of this patent or patent application publication with color drawing(s) will be provided by the Office upon request and payment of the necessary fee.

In the figures, like reference numerals refer to the same figure elements.

DETAILED DESCRIPTION

Figure 1:
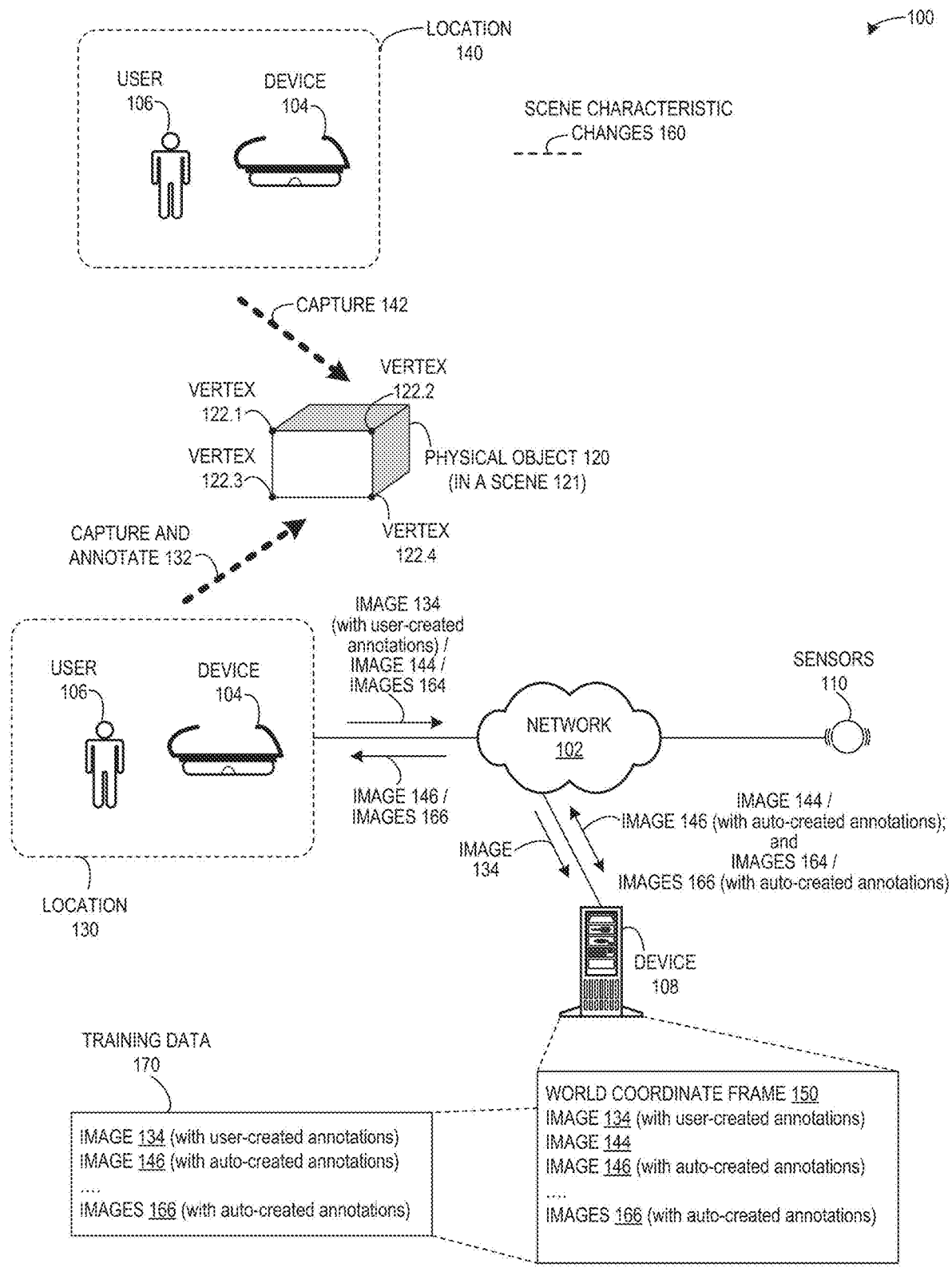
FIG. 1 illustrates an exemplary environment for facilitating efficient collection of training data, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein solve the problem of reducing the burden of manual labeling of training data by providing a system which allows a user to efficiently collect training data. The system allows a human to use a recording device to capture and annotate an object of interest in a single image. The system subsequently projects the annotations onto the same object of interest in many other similar images under varying conditions in the same environment.

Specifically, the user can use the recording device to capture images or videos of a physical object in an environment (e.g., a "scene") which is associated with a three-dimensional (3D) world coordinate frame. Using the recording device on a single image or video frame, the user can mark points on the physical object. A point can be a vertex with 3D coordinates based on the 3D world coordinate frame. Determining the 3D coordinates of a vertex may be based on visual cues or other position-sensing technologies that define a physical object pose in a scene. When the scene is changed (e.g., the user and the recording device move to a different location in the room relative to the physical object), the system can display to the user (on images or video captured under the changed conditions) the marked points projected to indicate a bounding box associated with the physical object.

For example, the recording device can be a camera with 3D-tracking sensors. The scene can be an office and the physical object of interest can be a printer in the office. The system can define the camera pose in the scene (i.e., the 3D world coordinate frame), while the user marks the vertices to indicate a region of interest on the physical object (e.g., annotates or labels a printer output tray on the printer). The system can track the marked vertices while varying one or more characteristics of the scene (e.g., changing the camera location, orientation, or pose).

The system can then project the marked vertices into the camera frame at different camera poses, where each projection is an automatically annotated image which can be used as part of the collected (and labeled) training data. That is, given other images of the printer take from different camera poses, the system can project the marked vertices onto the other images to indicate a bounding area around the region of interest on the printer, thus automatically annotating the other images based solely on the single annotated image. The bounding area can be a bounding box or a label which corresponds to a characteristic of the scene.

By using a recording device with a 3D sensor (or other position-sensing technology), the system allows a user to easily label the location, extent, pose or other properties of an object of interest once within an environment, and then project this labeling to a very large number of images or video frames taken under various conditions within the same environment. This process can generate, with little effort from the user, a large number of images or video frames of an object of interest under various conditions, where each image or frame is labeled with properties projected from the original environment.

Thus, the embodiments described herein provide a system which increases the efficiency collecting training data for machine learning. The increased efficiency can include a significant reduction in the amount of manual labeling required to annotate images, including multiple regions or objects of interest in the images. Because effective machine learning is based on the diversity of training data, and because the system efficiently collects diverse training data, the embodiments described herein improve the technological field of machine learning.

Exemplary Embodiments

In one exemplary embodiment, a user can use the Microsoft HoloLens system which uses an RGB-D (red green blue plus depth) camera plus a Simultaneous Localization and Mapping (SLAM) style algorithm to build a model of the room. The user can use the HoloLens to place virtual markers in the 3D model of the room to define the location and extent of an object of interest within the room. The user can take a number of pictures of the object from different views with the HoloLens, under different lighting conditions, at different distances and orientations, and in the presence of occluding objects. The HoloLens can calculate its pose within the 3D model of the room for each image.

The system can project the user's original markers from the 3D model of the room into each image to form a bounding box for the object of interest. These automatically annotated images can be used to train object detection and recognition systems employing technologies such as deep neural networks.

In another exemplary embodiment, a device that can track and record the position of hand movements can be used to annotate real-world objects. For example, the tracked hand-controllers included with the HTC Vive (which uses a NIR base station to track multiple sensors in the controller) can be used to trace boundaries of the real-world objects using a trigger input on the controller. In conjunction with a second calibrated camera (e.g., the embedded camera in the HTC Vive or an externally co-calibrated "mixed-reality" camera), objects can be imaged from different perspectives with properly aligned boundary annotations.

In a further exemplary embodiment, a device with magnetic sensors can be used to annotate and track the 3D coordinates. For example, a 3D motion tracking system by Polhemus can track the position and orientation of a sensor (e.g., on the recording device) as it moves through space by using electro-magnetic fields to determine the position and orientation of a remote object (e.g., the real-world object).

Improvements to Existing Technologies

Some common forms of augmented reality (AR) in the service industry include a tethered telepresence, a visual retrieval of information, and a repair script with overlays. However, each of these results is hindered by inefficiencies. In a tethered telepresence, a remote technician may need to perform a visual inspection, which can require both connectivity and extensive human expert time. In a visual retrieval of information (e.g., the Digital Glove Box application), a camera may retrieve a model number, manual pages, or telemetry statistics. However, the output is a passive page and may be limited to a single room. In a repair script with overlays, a checklist or procedural prompt may be overlaid on a user's view, and the user can click through the overlaid view. However, the view may be expensive to create and is still mostly passive, in that the view is not able to understand the user's actions. Thus, producing stand-alone AR content currently requires extensive work (e.g., by artists, human experts, and machine learning experts) to create images and video (e.g., animation) to train a model, which can result in an inefficient system.

The embodiments described herein provide a system which increases the efficiency of collecting training data for machine learning. In addition to decreasing the amount of manual time and labor required to collect training data, the system can also decrease the development time of new object detection systems. Beyond bounding box coordinates, the ground truth annotation can also capture 3D information about the object location, orientation, and pose from the recording device. The collected data can thus be used for a wider set of computer vision problems, e.g., estimation of pose, depth, size, object class, and properties such as "rough" vs. "smooth."

Furthermore, embodiments of the system can quickly create large labeled data sets of parts of systems managed by customers, and use the labeled data sets to train computer vision systems. A trained system can assist service technicians with management and repair of a part of a system, and can also allow a customer to assist an end-user with repair of a system part (e.g., the Digital GloveBox and SmartScan applications). A differentiator between these existing tools and the proposed technology is the large amount of time needed to collect the training data for the computer vision systems encased within the existing tools. This large amount of time can be reduced to a tiny fraction (e.g., $\frac{1}{10}$) by using the embodiments of the system to collect training data.

Other exemplary systems managed by customers can include: cars or vehicles (where the dashboard or other car part, e.g., an engine or a feature in the cabin of the car, may be a region of interest for which the customer may require assistance); and printers or other devices (where a feeder tray, output tray, control panel, or other part may be the region of interest). A customer (or an end-user) who may require assistance can take a photo of the system with his cell phone, and obtain useful information about a certain "labeled" section of the photo. For example, if a user of a vehicle experiences an issue with the vehicle, the vehicle user can capture an image of the vehicle dashboard with his mobile device, and, based on the previously generated diverse set of labeled images of the dashboard from various camera poses, the vehicle user can obtain a labeled image that may be used to assist the user in understanding how to address the issue.

Embodiments of the system can also create deep vision-powered tools that allow domain experts to easily create new, stand-alone, interactive augmented reality coaches without needing expertise in machine learning of 3D modeling tools. The system can include features related to authoring, such as gestures for pointing out objects and regions, speech-to-text to provide labels, and object part segmentations. The system can also include curation, such as storage, indexing and metadata, and basic editing of clips. The system can further include features related to assistance, such as part recognition, label placement, flow control, and part condition determination. The system can increase robustness and generalization of training through background desensitivity, automatic lighting augmentation, and shadow generation. Furthermore, the system can include voice and activity recognition to support interactive coaching, as well as application integration and telemetry connections.

Thus, by using external tracking sensors to annotate data, and by using augmented reality/virtual reality (AR/VR) to collect annotated training data for machine learning, the embodiments described herein can exploit the capability of AR/VR to collect training data from multiple perspectives without requiring re-labeling for every new perspective of a scene. This can result in a significant reduction in the burden of labeling for training an effective computer vision system.

Exemplary Environment for Facilitating Efficient Collection of Training Data

FIG. 1 illustrates an exemplary environment 100 for facilitating efficient collection of training data, in accordance with an embodiment of the present invention. Environment 100 can include: a device 104 and an associated user 106; a device 108; a physical object 120; and sensors 110. Device 104 can include an augmented reality device (such as a Microsoft HoloLens). Physical object 120 can be part of a scene 121 (not shown) which has an associated 3D world coordinate frame. Device 108 can include a server or other computing device which can receive, transmit, and store data, and can perform an algorithm to project vertices into images taken from multiple perspectives in the 3D world coordinate frame. Sensors 110 and other tracking sensors (not shown) can work together with device 104 in a system to capture images, annotate images, determine 3D coordinates, store annotated images, project images, and display projected images. Device 104, device 108, and sensors 110 can communicate via a network 102.

During operation, user 106 can use device 104 from a location 130 in the 3D world coordinate frame to capture and annotate (function 132) an image 134 of physical object 120, and send image 134 (with user-created annotations) to device 108. The annotated image can include multiple marked vertices which are associated with 3D coordinates in the 3D world coordinate frame.

User 106 can use device 104 from a location 140 (which is different from location 130) to capture (function 142) an image 144 of physical object 120, and send image 144 to device 108. Device 108 can perform an algorithm to project the marked vertices from image 144 onto an image 146, and send image 146 (with auto-created annotations) back to user 106, to be displayed on device 104.

Furthermore, user 106 can use device 104 based on various scene characteristic changes 160 (e.g., other locations, different camera poses, different lighting conditions, etc.), and transmit images 164 via network 102 to device 108. Device 108 can perform the algorithm to project the marked vertices (as identified or registered in image 144) onto images 166, and send images 166 (with auto-created annotations) back to user 106, to be displayed on device 104.

Device 108 can store data, such as: a world coordinate frame 150, which corresponds to scene 121 and describes an environment that includes physical object 120; image 134 (with user-created annotations); image 144, as captured by user 106; image 146 (with auto-created annotations); and images 166 (with auto-created annotations). Device 108 can also store, as a collection of data, training data 170, which can include images 134, 144, and 166.

Method for Facilitating Efficient Collection of Training Data

Figure 2:
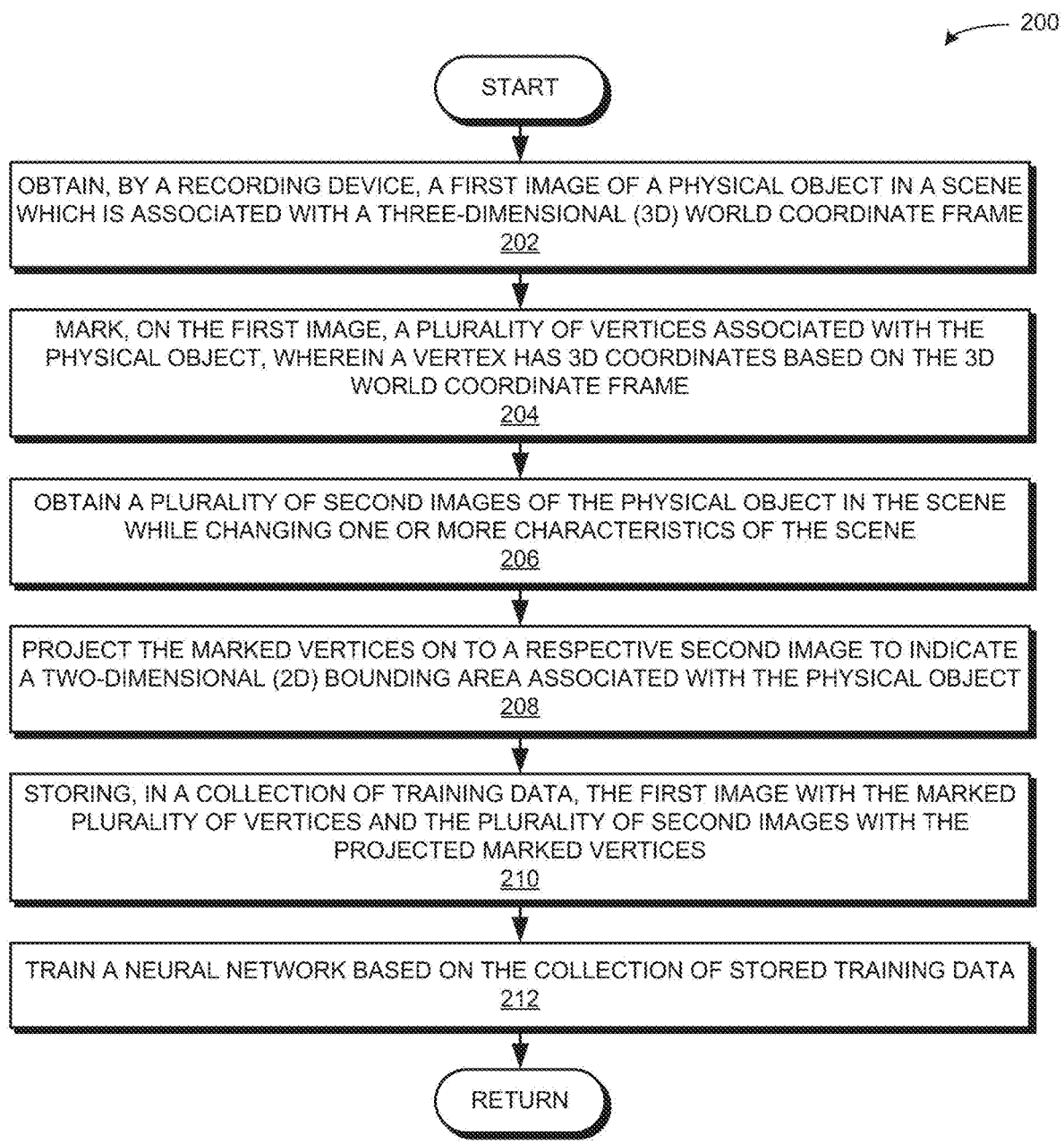
FIG. 2 presents a flowchart illustrating a method for facilitating efficient collection of training data, in accordance with an embodiment of the present application.

FIG. 2 presents a flow chart 200 illustrating a method for facilitating efficient collection of training data, in accordance with an embodiment of the present invention. During operation, the system obtains, by a recording device, a first image of a physical object in a scene which is associated with a three-dimensional (3D) world coordinate frame (operation 202). The system marks, on the first image, a plurality of vertices associated with the physical object, wherein a vertex has 3D coordinates based on the 3D world coordinate frame (operation 204). The system obtains a plurality of second images of the physical object in the scene while changing one or more characteristics of the scene (operation 206). The system projects the marked vertices on to a respective second image to indicate a two-dimensional (2D) bounding area associated with the physical object (operation 208). The system stores, in a collection of training data, the first image with the marked plurality of vertices and the plurality of second images with the projected marked vertices (operation 210). The system trains a neural network based on the collection of stored training data (operation 212).

Further Exemplary Embodiments: Annotating Multiple Regions of Interest at One Time; Annotating Subsequent to Capturing Images or Video;

Annotating Volumes

The embodiments described herein can annotate multiple regions of interest at a time in a single image (or frame) (e.g., by marking multiple plurality of vertices/points), such that a single user-annotated image with multiple marked pluralities of vertices can result in the generation of images from different camera poses, where each image displays the annotated multiple regions of interest. That is, the system can label multiple regions of interest simultaneously.

Furthermore, the embodiments described herein allow a user to first capture many images, and then annotate one image, whereupon the system can automatically annotate the previously captured images based on the user-annotated image. For example, assume that a user walks around an object for 30 seconds and captures 100 images with a recording device or system. After walking for some period of time and capturing some images (e.g., after walking for seven seconds and capturing 24 images), the user can label or mark an image (e.g., the 25th image), which can cause the system to automatically annotate both the previously captured 24 images as well as the subsequently captured 75 images.

The embodiments described herein can also provide annotation of surface planes by marking polygons, such as a shape which can indicate a bounding box. The polygons can be either convex or non-convex. Marking a non-convex polygon may require additional information, and can be based on, e.g., an order in which the points are marked. Furthermore, embodiments of the system can provide annotation of a volume, such as marking a plurality of points to indicate a cube around the entire printer itself. The system can project the entire volume onto subsequent images or video frames which are automatically annotated based on the annotated volume.

Figure 3:
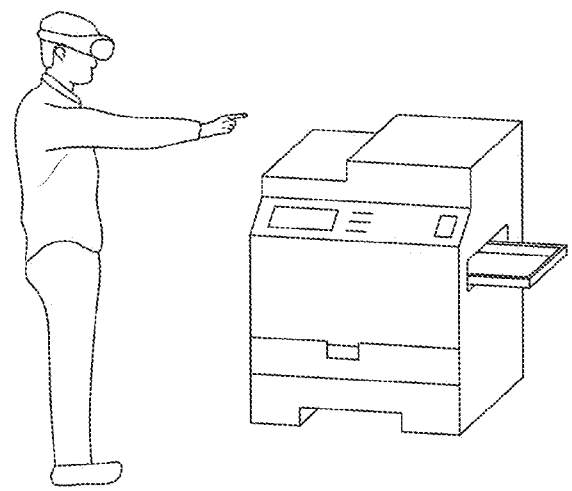
FIG. 3 illustrates a human using an AR device to mark corners of system features, in accordance with an embodiment of the present invention.

Exemplary Demonstration of Method for Facilitating Efficient Collection of Training Data FIGS. 3, 4A-B, 5A-B, 6A-B, and 7A-C illustrate exemplary images for facilitating efficient collection of training data. FIG. 3 illustrates a human using an AR device to mark corners of system features, in accordance with an embodiment of the present invention. The environment in FIG. 3 is a room with several objects, including a printer. The AR device can be a Microsoft HoloLens, a system which can define the 3D world coordinate frame for an environment (e.g., the room).

Figure 4A:
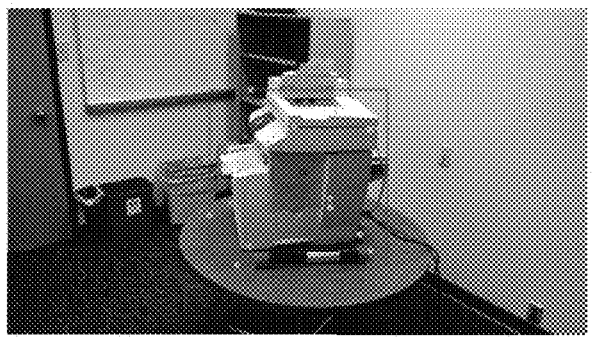
FIG. 4A illustrates an example of creating a bounding box of a printer from a first perspective using an AR device, in accordance with an embodiment of the present invention.

FIG. 4A illustrates an example of creating a bounding box of a printer from a first perspective using an AR device, in accordance with an embodiment of the present invention. The user can stand at a location in the room and obtain an image. That is, the user can capture an image of the room, including the printer, from a certain perspective, where the perspective is based on the pose, location, orientation, etc., of the AR device in relation to the printer. Using the AR device, the user can place green markers in a first image taken from this first perspective, and the system can display on this image a bounding area defined by the green markers. In FIG. 4A, the bounding area appears as box with a blue outline around the printer. The system thus marks the plurality of vertices associated with the physical object.

Figure 4B:
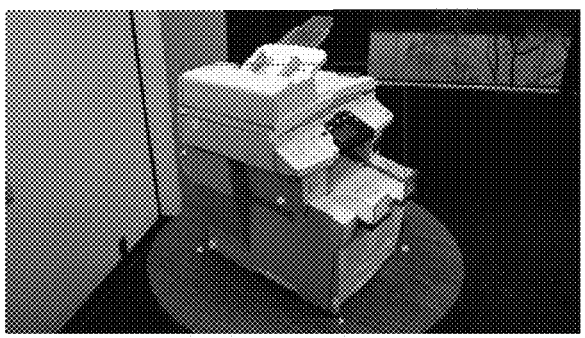
FIG. 4B illustrates an example of creating a bounding box of a printer from a second perspective using an AR device, in accordance with an embodiment of the present invention.

FIG. 4B illustrates an example of creating a bounding box of a printer from a second perspective using an AR device, in accordance with an embodiment of the present invention. In FIG. 4B, using the AR device from a second perspective, the user can capture a second image of the room. The second perspective is different from the first perspective of FIG. 4A (i.e., where the AR device is in a different pose, location, orientation, etc. in relation to the printer). The system can project on to the second image the marked vertices as green markers, and also project on to the second image a bounding area defined by the projected green markers.

FIGS. 4A and 4B illustrate marking a single region of interest in a scene. As described above, a user can annotate multiple regions of interest at a time in a single frame by marking multiple pluralities of vertices of a physical object. As such, a single user-annotated frame with multiple annotated regions of interest can result in the generation of images from different camera poses, where each image displays the annotated multiple regions of interest. That is, the system can label multiple regions of interest simultaneously.

Figure 5A:
FIG. 5A illustrates an example of creating a bounding box of printer parts from a first perspective using an AR device, in accordance with an embodiment of the present invention.

FIG. 5A illustrates an example of creating a bounding box of printer parts from a first perspective using an AR device, in accordance with an embodiment of the present invention. Using the AR device, the user can place green markers (not shown) on multiple regions of interest in a first image taken from this first perspective, and the system can display on this image multiple bounding areas defined by the green markers, e.g., a blue bounding box corresponding to the output tray, a green bounding box corresponding to the control panel, and a red bounding box corresponding to the paper drawer. In some embodiments, FIG. 5A illustrates a display of the image based on previously marked vertices, such that the system displays on to this first image the multiple bounding boxes based on the previously marked vertices.

Figure 5B:
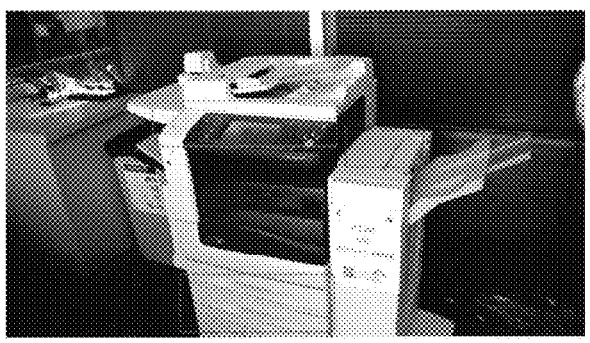
FIG. 5B illustrates an example of creating a bounding box of printer parts from a second perspective using an AR device, in accordance with an embodiment of the present invention.

FIG. 5B illustrates an example of creating a bounding box of printer parts from a second perspective using an AR device, in accordance with an embodiment of the present invention. In FIG. 5B, using the AR device from a second perspective, the user can capture a second image of the room. The system can project on to this second image the marked plurality of vertices as green markers (not shown), and also project on to this second image the multiple bounding areas as defined by the previously marked plurality of vertices. Similar to FIG. 5A, a blue bounding box corresponds to the output tray, a green bounding box corresponds to the control panel, and a red bounding box corresponds to the paper drawer.

Figure 6A:
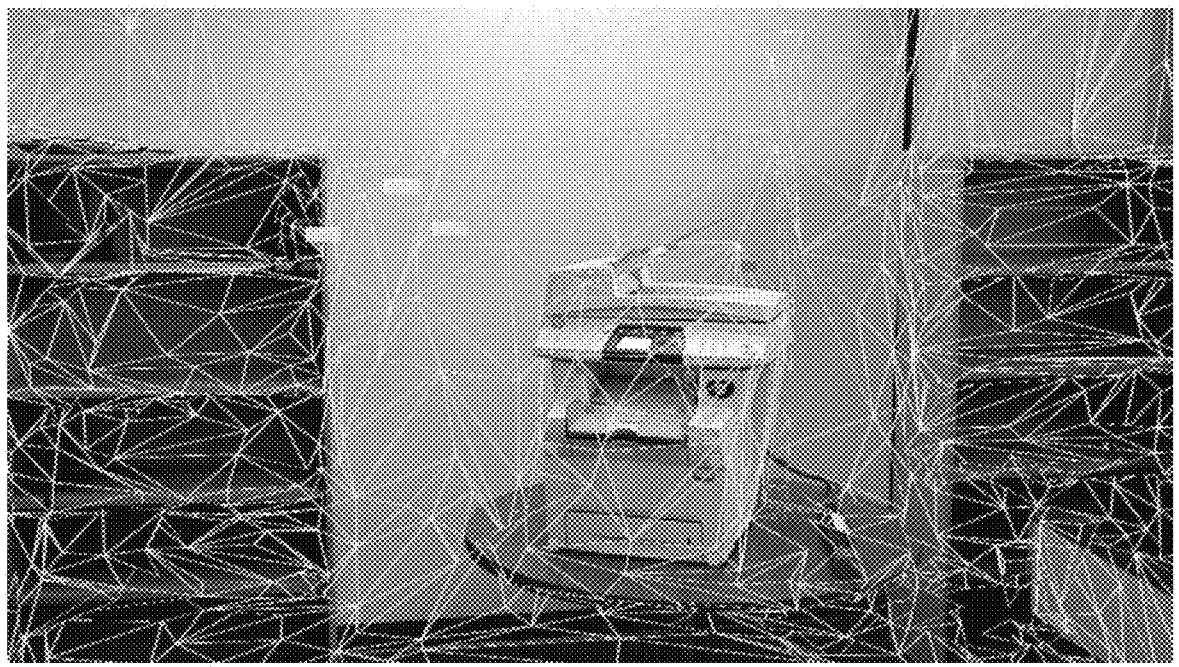
FIG. 6A illustrates a labeling interface that can be used with Microsoft HoloLens, in accordance with an embodiment of the present invention.

FIG. 6A illustrates a labeling interface that can be used with Microsoft HoloLens, in accordance with an embodiment of the present invention. Using the Microsoft HoloLens, the user can view control buttons (e.g., the green oval and the blue circle) and surface meshes (e.g., white polygons) of the environment. The user can annotate the viewed image by placing several virtual markers (green, red, and blue squares) using hand movements while wearing the Microsoft HoloLens. The markers can correspond to various regions of interest associated with the printer. For example, the user can annotate that the green markers correspond to a paper drawer, the red markers correspond to a manual input area, and blue markers correspond to a control panel.

Figure 6B:
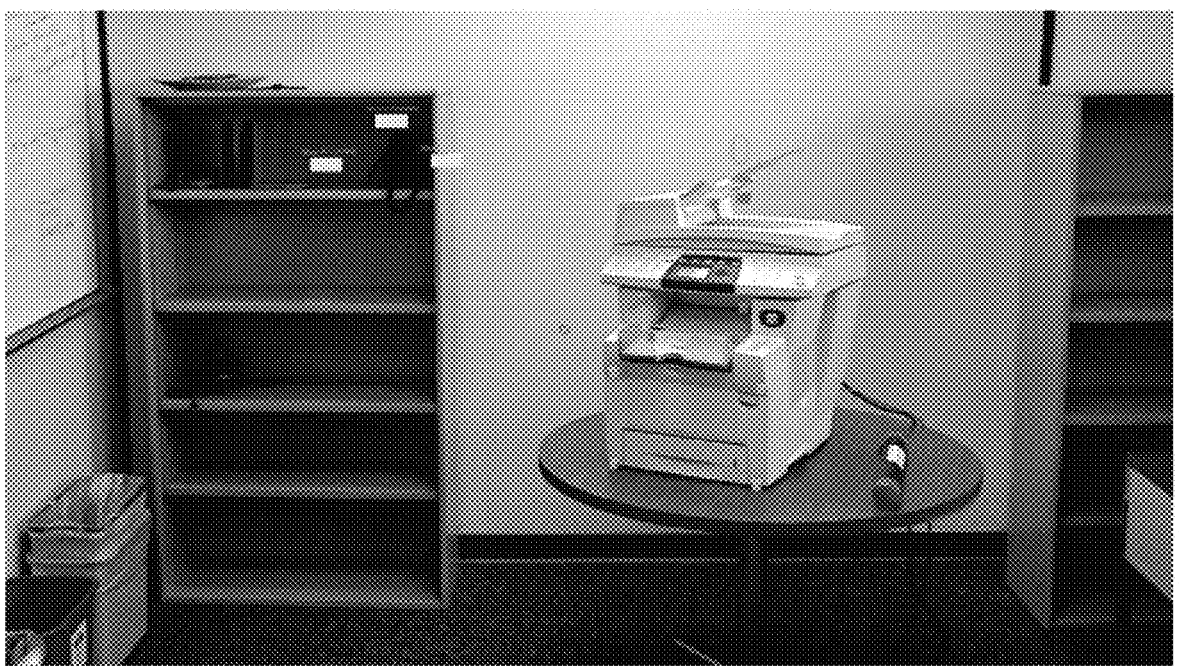
FIG. 6B illustrates the labeling interface of FIG. 6A without the surface meshes, in accordance with an embodiment of the present invention.

FIG. 6B illustrates the labeling interface of FIG. 6A without the surface meshes, in accordance with an embodiment of the present invention.

Figure 7C:
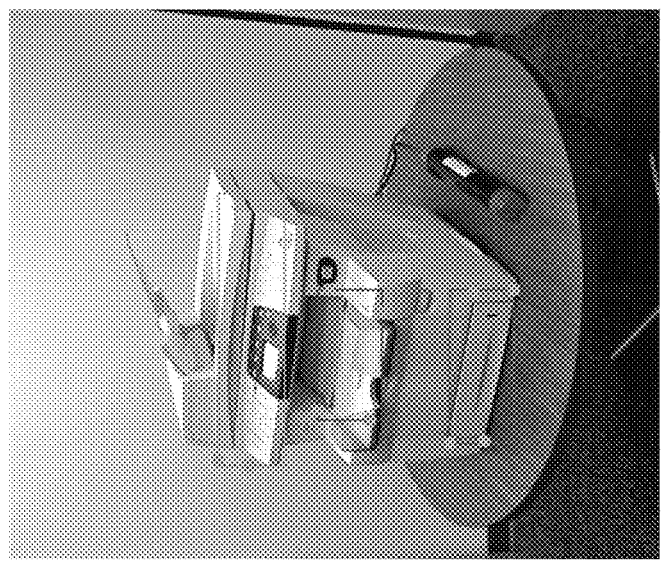
FIG. 7C illustrates an example of automatically generated two-dimensional marker locations and the corresponding bounding boxes from a second perspective using the Microsoft HoloLens interface, in accordance with an embodiment of the present invention.
Figure 7B:
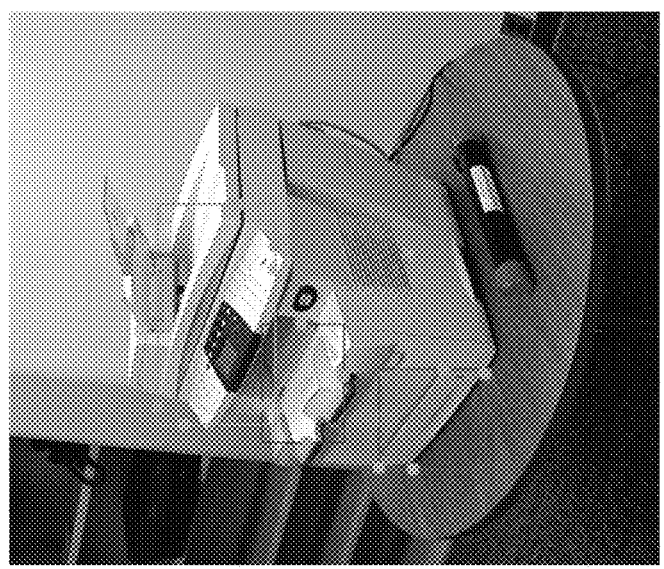
FIG. 7B illustrates an example of automatically generated two-dimensional marker locations and the corresponding bounding boxes from a second perspective using the Microsoft HoloLens interface, in accordance with an embodiment of the present invention.
Figure 7A:
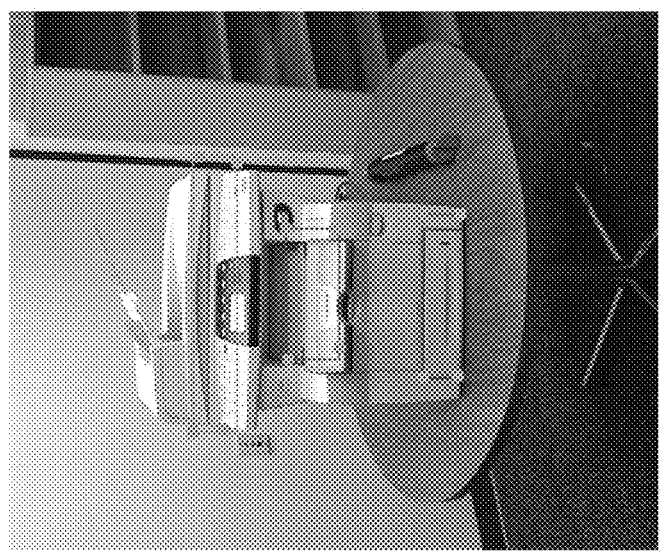
FIG. 7A illustrates an example of automatically generated two-dimensional marker locations and the corresponding bounding boxes from a first perspective using the Microsoft HoloLens interface, in accordance with an embodiment of the present invention.

FIGS. 7A-7C illustrate automatically generated marker locations and bounding boxes based on the annotations taken by the user in FIGS. 6A and 6B. Note that while the color of the bounding areas in FIGS. 7A-7C are different than the corresponding bounding areas in FIGS. 6A, the system displays the same previously annotated multiple regions of interest. In addition, the user can set the indicator of the bounding area to any type, pattern, or color of a connector between the marker locations.

FIG. 7A illustrates an example of automatically generated two-dimensional marker locations and the corresponding bounding boxes from a first perspective using the Microsoft HoloLens interface, in accordance with an embodiment of the present invention. In FIG. 7A, a green bounding box corresponds to the control panel, a blue bounding box corresponds to the manual input area, and a red bounding box corresponds to the paper drawer.

FIG. 7B illustrates an example of automatically generated two-dimensional marker locations and the corresponding bounding boxes from a second perspective using the Microsoft HoloLens interface, in accordance with an embodiment of the present invention. In FIG. 7B, a green bounding box corresponds to the control panel, a blue bounding box corresponds to the manual input area, and a red bounding box corresponds to the paper drawer.

FIG. 7C illustrates an example of automatically generated two-dimensional marker locations and the corresponding bounding boxes from a second perspective using the Microsoft HoloLens interface, in accordance with an embodiment of the present invention. In FIG. 7C, a green bounding box corresponds to the control panel, a blue bounding box corresponds to the manual input area, and a red bounding box corresponds to the paper drawer.

Exemplary Computer and Communication System

Figure 8:
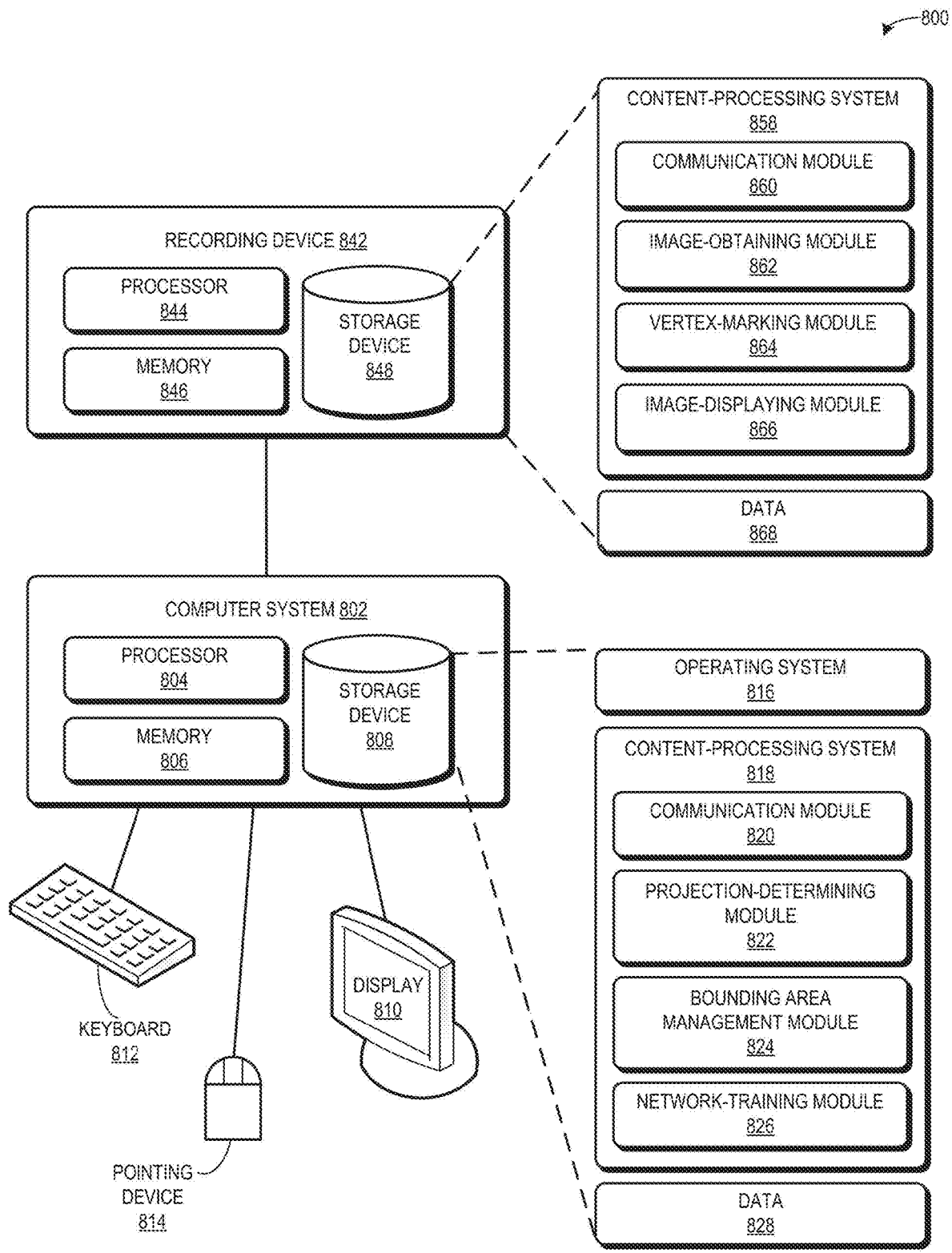
FIG. 8 illustrates an exemplary computer and communication system that facilitates efficient collection of training data, in accordance with an embodiment of the present invention.

FIG. 8 illustrates an exemplary computer and communication system 800 that facilitates efficient collection of training data, in accordance with an embodiment of the present invention. System 800 includes a computer system 802 and a recording device 842, which can communicate via a network (not shown). Computer system 802 and recording device 842 can correspond, respectively, to device 108 and device 104 of FIG. 1.

Computer system 802 includes a processor 804, a memory 806, and a storage device 808. Memory 806 can include a volatile memory (e.g., RAM) that serves as a managed memory, and can be used to store one or more memory pools. Furthermore, computer system 802 can be coupled to a display device 810, a keyboard 812, and a pointing device 814. Storage device 808 can store an operating system 816, a content-processing system 818, and data 828.

Content-processing system 818 can include instructions, which when executed by computer system 802, can cause computer system 802 to perform methods and/or processes described in this disclosure. Specifically, content-processing system 818 may include instructions for sending and/or receiving/obtaining data packets to/from other network nodes across a computer network (communication module 820). A data packet can include an image, a video, a video frame, 3D coordinates of a vertex, and information about a scene or a physical object in the scene.

Content-processing system 818 can include instructions for receiving a first image of a physical object in a scene which is associated with a 3D world coordinate frame, and for receiving a plurality of second images of the physical object in the scene based on one or more changed characteristics of the scene (communication module 820). Content-processing system 818 can include instructions for registering a marked plurality of vertices associated with the physical object (projection-determining module 822). Content-processing system 818 can include instructions for determining a projection of the marked vertices on to a respective second image (projection-determining module 822). Content-processing system 818 can include instructions for indicating a 2D bounding area associated with the physical object (bounding area management module 824). Content-processing system 818 can include instructions for storing the first image and the second images in a collection of training data, and for training a convolutional neural network to identify features of the physical object (network-training module 826).

Recording device 842 includes a processor 844, a memory 846, and a storage device 848. Memory 846 can include a volatile memory (e.g., RAM) that serves as a managed memory, and can be used to store one or more memory pools. Storage device 848 can store a content-processing system 858 and data 868.

Content-processing system 858 can include instructions, which when executed by recording device 842, can cause recording device 842 to perform methods and/or processes described in this disclosure. Specifically, content-processing system 858 may include instructions for sending and/or receiving/obtaining data packets to/from other network nodes across a computer network (communication module 860). A data packet can include an image, a video, a video frame, 3D coordinates of a vertex, and information about a scene or a physical object in the scene.

Content-processing system 858 can include instructions for obtaining a first image of a physical object in a scene which is associated with a three-dimensional (3D) world coordinate frame (image-obtaining module 862). Content-processing system 858 can include instructions for marking, on the first image, a plurality of vertices associated with the physical object, wherein a vertex has 3D coordinates based on the 3D world coordinate frame (vertex-marking module 864). Content-processing system 858 can include instructions for obtaining a plurality of second images of the physical object in the scene while changing one or more characteristics of the scene (image-obtaining module 862). Content-processing system 858 can include instructions for projecting the marked vertices on to a respective second image to indicate a two-dimensional (2D) bounding area associated with the physical object (image-displaying module 866).

Data 828 and 868 can include any data that is required as input or that is generated as output by the methods and/or processes described in this disclosure. Specifically, data 828 and 868 can store at least: data; an image; an image of a physical object; a 3D world coordinate frame; a vertex; 3D coordinates for a vertex; a scene; a characteristic of the scene; an indicator of a region of interest on a physical object; marked vertices; a projection of the marked vertices; a polygon; a portion of a surface plane; a volume; a 2D shape; a 3D volume; a 2D bounding area; an annotation; a label; a type, pattern, or color of a connector between projected vertices in an image; a color, shading, or fill of a shape formed by connecting projected vertices in an image; text describing a 2D bounding area; an indication of a label or description for a 2D bounding area; a pose of the recording device; a lighting of the scene; a distance of the recording device from the physical object; an orientation of the recording device in relation to the physical object; a background of the physical object or the scene; an occlusion of one or more portions of the physical object; a collection of training data; a trained network; an image with user-created annotations; and an image with system-created or automatically generated annotations.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer system for facilitating efficient collection of training data, the system comprising:
    a processor; and
    a storage device storing instructions that when executed by the processor cause the processor to perform a method, the method comprising:
    obtaining, by a recording device, a first image of a physical object in a scene which is associated with a three-dimensional (3D) world coordinate frame;
    marking, by a user of the recording device on the first image, a plurality of vertices associated with the physical object, wherein a vertex has 3D coordinates based on the 3D world coordinate frame;

obtaining, by the recording device, a plurality of second images of the physical object in the scene while changing one or more characteristics of the scene;

displaying, by the recording device on a display of the recording device, a respective second image of the physical object in the scene by:

projecting, on the display, the marked plurality of vertices associated with the physical object onto the respective second image; and indicating, on the display, a two-dimensional (2D) bounding area which is associated with the physical object and includes the marked vertices; and storing, in a collection of training data, the first image with the marked plurality of vertices and the plurality of second images with the projected marked vertices.

2. The computer system of claim 1, wherein the method further comprises:

providing information to a user based on the collection of training data;

managing or repairing a first part or a first component associated with the computer system based on the provided information; and guiding an end-user with repair of a second part or a second component associated with the computer system based on the provided information.

3. The computer system of claim 2, wherein the computer vision system is used in a field which involves one or more of:

cars or vehicles;
printers or other devices;
authoring objects; and
curating objects, including one or more of storing data, indexing data and associated metadata, and editing data.

4. The computer system of claim 2, wherein managing or repairing a part or a component of the computer vision system is based on one or more of:

part recognition, label placement, flow control, and part condition determination;
background desensitivity, automatic lighting augmentation, and shadow generation; and
interactive coaching, application integration, and telemetry connections.

5. The computer system of claim 1, wherein the method further comprises:

obtaining, by the recording device, 3D information associated with a location, orientation, or pose of the physical object; and
applying the obtained 3D information in a computer vision system.

6. The computer system of claim 5, wherein obtaining the 3D information is based on the first image and plurality of second images.

7. A computer system for facilitating efficient collection of training data, the system comprising:

a processor; and
a storage device storing instructions that when executed by the processor cause the processor to perform a method, the method comprising:
obtaining, by a recording device, a plurality of images of a physical object in a scene which is associated with a three-dimensional (3D) world coordinate frame, wherein the images are captured by a user of the recording device while changing one or more characteristics of the scene;

subsequent to the user capturing the plurality of images, annotating, by the user, at least one of the images by marking a plurality of vertices associated with the physical object, wherein a user-marked vertex has 3D coordinates based on the 3D world coordinate frame;

generating annotations for a remainder of the images not annotated by the user;

displaying, on a display of the recording device, the at least one user-annotated image; and displaying a respective image of the annotated remainder of the images by projecting the marked plurality of vertices associated with the physical object onto the respective image, wherein displaying the respective image comprises indicating a two-dimensional (2D) bounding area associated with one or more regions of interest on the physical object corresponding to the user-marked vertices.

8. The computer system of claim 7, wherein the marked plurality of vertices can indicate one or more of:

a polygon;
a portion of a surface plane; and
a volume.

9. The computer system of claim 7, wherein the 2D bounding area and the respective image are presented on a display associated with the recording device, and wherein the 2D bounding area indicates a 2D shape or a 3D volume.

10. The computer system of claim 7, wherein the 2D bounding area is indicated by one or more of:

a type, pattern, or color of a connector between the projected vertices in the respective image;
a color, shading, or fill of a shape formed by connecting the projected vertices in the respective image;
text describing the 2D bounding area; and
an indication of a label or description for the 2D bounding area.

11. The computer system of claim 7, wherein the 2D bounding area corresponds to a characteristic of the scene.

12. The computer system of claim 7, wherein a characteristic of the scene comprises one or more of:

a pose of the recording device;
a lighting of the scene;
a distance of the recording device from the physical object;
an orientation of the recording device in relation to the physical object;
a background of the physical object or the scene; and
an occlusion of one or more portions of the physical object.

13. The computer system of claim 7, wherein the method further comprises:

storing, in a collection of training data, the at least one user-annotated image with the marked plurality of vertices; and
storing, in the collection of training data, the annotated remainder of the images with the projected marked vertices.

14. The computer system of claim 13, wherein the method further comprises:

providing information to a user based on the collection of training data;
managing or repairing a first part or a first component associated with the computer system based on the provided information; and guiding an end-user with repair of a second part or a second component associated with the computer system based on the provided information.

15. The computer system of claim 14, wherein the computer system is used in a field which involves one or more of:
   cars or vehicles;
   printers or other devices;
   authoring objects; and
   curating objects, including one or more of storing data, indexing data and associated metadata, and editing data; and
   wherein managing or repairing the first part or the first component associated with the computer system is based on one or more of:
      part recognition, label placement, flow control, and part condition determination;
      background desensitivity, automatic lighting augmentation, and shadow generation;
      interactive coaching, application integration, and telemetry connections.

16. The computer system of claim 7, wherein the recording device includes one or more of:
   an augmented reality device;
   a virtual reality device;
   a device with magnetic sensors which determine 3D coordinates for a vertex in the 3D world coordinate frame;
   a camera and a hand-tracking sensor;
   a camera which records red, green, and blue (RGB), wherein the hand-tracking sensor determines 3D coordinates for a vertex in the 3D world coordinate frame;
   a camera which records red, green, and blue (RGB), and a 3D sensor which records a depth;
   a device which records images or video, and determines 3D coordinates for a vertex in the 3D world coordinate frame based on visual cues or a position-sensing technology; and
   a device which records images or video and includes a (3D) sensor.

17. The computer system of claim 7, wherein the method further comprises:
   obtaining, by the recording device based on the plurality of images, 3D information associated with a location, orientation, or pose of the physical object; and
   applying the obtained 3D information in a computer vision system.

18. A computer-implemented method for facilitating efficient collection of training data, the method comprising:
   obtaining, by a recording device, a plurality of images of a physical object in a scene which is associated with a three-dimensional (3D) world coordinate frame, wherein the images are captured by a user of the recording device while changing one or more characteristics of the scene;
   subsequent to the user capturing the plurality of images, annotating, by the user, at least one of the images by marking a plurality of vertices associated with the physical object, wherein a user-marked vertex has 3D coordinates based on the 3D world coordinate frame;
   generating annotations for a remainder of the images not annotated by the user;
   displaying, on a display of the recording device, the at least one user-annotated image; and
   displaying a respective image of the annotated remainder of the images by projecting the marked plurality of vertices associated with the physical object onto the respective image,
   wherein displaying the respective image comprises indicating a two-dimensional (2D) bounding area associated with one or more regions of interest on the physical object corresponding to the user-marked vertices.

19. The computer-implemented method of claim 18, wherein the 2D bounding area and the respective image are presented on a display associated with the recording device, and
   wherein the 2D bounding area indicates a 2D shape or a 3D volume.

20. The computer-implemented method of claim 18, wherein the 2D bounding area corresponds to a characteristic of the scene, and
   wherein a characteristic of the scene comprises one or more of:
      a pose of the recording device;
      a lighting of the scene;
      a distance of the recording device from the physical object;
      an orientation of the recording device in relation to the physical object;
      a background of the physical object or the scene; and
      an occlusion of one or more portions of the physical object.

* * * * *